United States Patent
Yamaji

(10) Patent No.: US 11,947,854 B2
(45) Date of Patent: Apr. 2, 2024

(54) INFORMATION PROCESSING APPARATUS, INFORMATION PROCESSING METHOD, PROGRAM, AND RECORDING MEDIUM

(71) Applicant: FUJIFILM Corporation, Tokyo (JP)

(72) Inventor: Kei Yamaji, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/066,794

(22) Filed: Dec. 15, 2022

(65) Prior Publication Data
US 2023/0244431 A1    Aug. 3, 2023

(30) Foreign Application Priority Data

Feb. 2, 2022   (JP) .................................. 2022-014972

(51) Int. Cl.
G06F 15/00 (2006.01)
G06F 3/01 (2006.01)
G06F 3/12 (2006.01)

(52) U.S. Cl.
CPC ............ *G06F 3/1273* (2013.01); *G06F 3/011* (2013.01); *G06F 3/1205* (2013.01); *G06F 2203/011* (2013.01)

(58) Field of Classification Search
CPC ....... G06F 3/1273; G06F 3/011; G06F 3/1205
USPC ......................................................... 358/1.15
See application file for complete search history.

(56) References Cited

U.S. PATENT DOCUMENTS

2004/0201711 A1* 10/2004 Lopaz ................ H04N 1/00424
                                                                 348/211.99
2020/0192609 A1*  6/2020 Shinkai .................. G06N 3/048

FOREIGN PATENT DOCUMENTS

JP         2019-192016 A    10/2019

* cited by examiner

*Primary Examiner* — Mark R Milia
(74) *Attorney, Agent, or Firm* — Studebaker & Brackett PC

(57) ABSTRACT

There are provided an information processing apparatus, an information processing method, a program, and a recording medium capable of proposing appropriate information to a user in a network printing technology. An information processing apparatus according to an embodiment of the present invention is an apparatus that includes a processor and implements printing of an image sent from a first user by a second user side. The processor is configured to execute proposal processing of proposing information about an image to be sent to the second user, information about setting of the printing, or information about a material to be used for the printing to the first user or the second user based on a behavior history of the first user related to an image and a behavior history of the second user related to an image.

20 Claims, 8 Drawing Sheets

| IMAGING HISTORY OF USER A |||||
|---|---|---|---|---|
| SUBJECT | IMAGING SCENE | PHOTOGRAPHER | IMAGING DATE AND TIME | |
| ** |  |  | // | |
| ** |  |  | // | |
| ⋮ | ⋮ | ⋮ | ⋮ | |

FIG. 5B

RECEPTION HISTORY OF USER A

| SUBJECT | IMAGING SCENE | RECIPIENT | TRANSMISSION SOURCE | IMAGING DATE AND TIME |
|---|---|---|---|---|
| ** |  |  |  | // |
| ** |  |  |  | // |
| ⋮ | ⋮ | ⋮ | ⋮ | ⋮ |

FIG. 5C

TRANSMISSION HISTORY OF USER A

| SUBJECT | IMAGING SCENE | SENDER | TRANSMISSION SOURCE | IMAGING DATE AND TIME |
|---|---|---|---|---|
| ** |  |  |  | // |
| ** |  |  |  | // |
| ⋮ | ⋮ | ⋮ | ⋮ | ⋮ |

FIG. 5D

PRINTING HISTORY OF USER A

| SUBJECT | IMAGING SCENE | PERSON WHO IMPLEMENTS PRINTING | PROVIDER OF PRINTED IMAGE | NUMBER OF TIMES OF PRINTING | IMAGING DATE AND TIME OF PRINTED IMAGE |
|---|---|---|---|---|---|
| ** |  |  |  |  TIMES | //** |
| ** |  |  |  |  TIMES | //** |
| ⋮ | ⋮ | ⋮ | ⋮ | ⋮ | ⋮ |

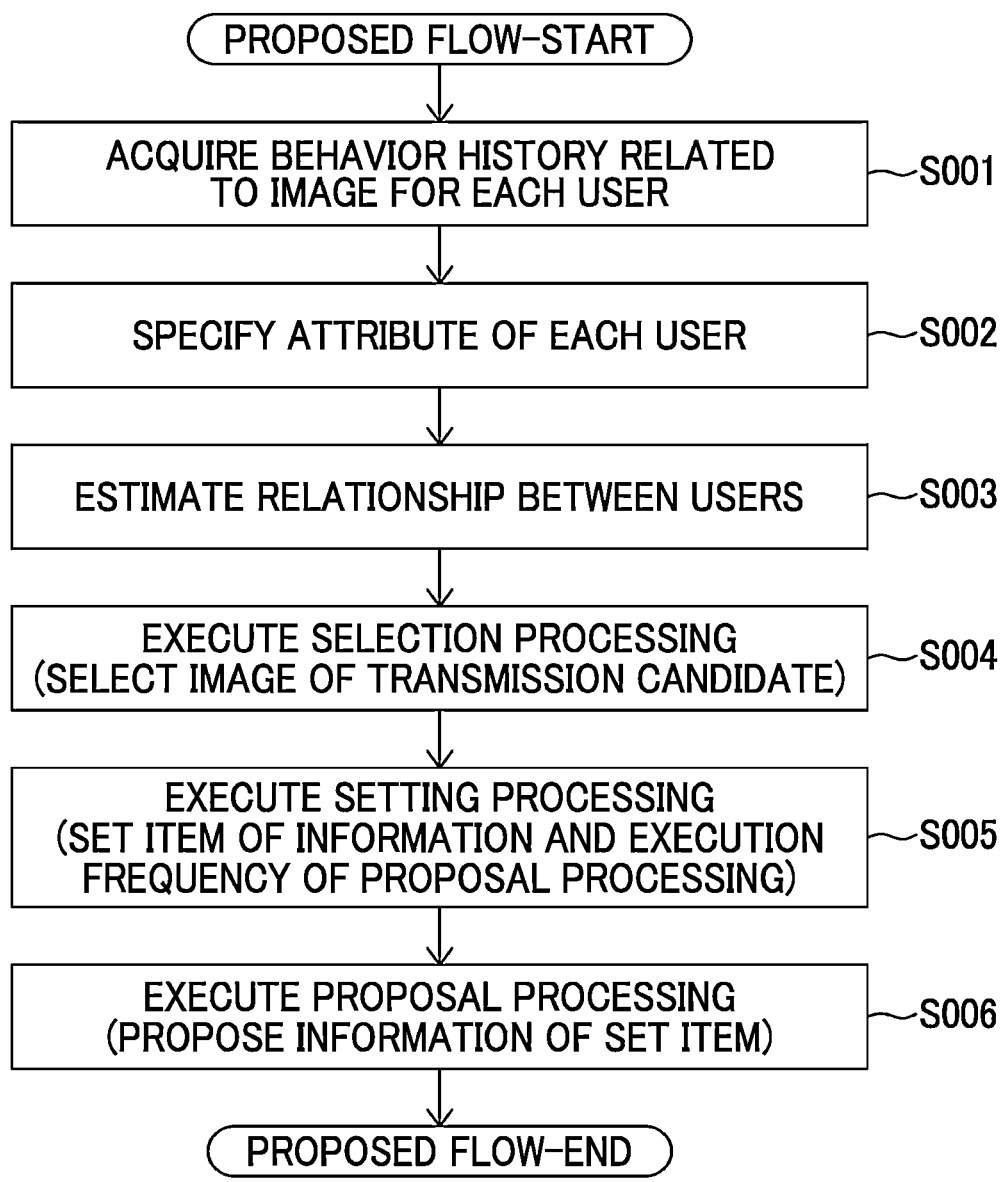

FIG. 8
IMAGE GROUP OF USER A
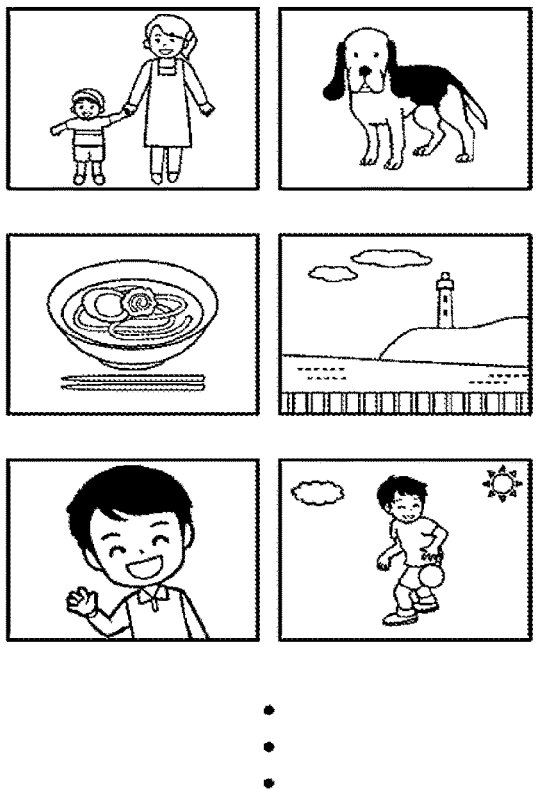
IMAGE OF TRANSMISSION CANDIDATE TO USER B
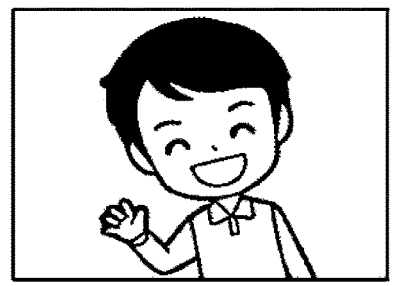
IMAGE OF TRANSMISSION CANDIDATE TO USER C
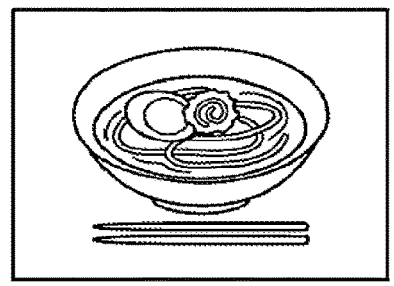

INFORMATION PROCESSING APPARATUS, INFORMATION PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2022-014972, filed on Feb. 2, 2022. The above application is hereby expressly incorporated by reference, in its entirety, into the present application.

BACKGROUND OF THE INVENTION

1. Field of the Invention

The present invention relates to an information processing apparatus, an information processing method, a program, and a recording medium for implementing printing of an image.

2. Description of the Related Art

In recent years, with the spread of a network communication technology, it is possible to send images between users, and it is possible to print an image provided by one user on the other user side (see, for example, JP2019-192016A).

SUMMARY OF THE INVENTION

In the network printing technology described in JP2019-192016A, in a case where information about the use of an image can be proposed to a user of an image provider or a user of an image transmission destination, the use of the network printing can be promoted. In this case, it is desirable that the information to be proposed to the user is appropriately determined.

The present invention has been made in view of the above-described circumstances, and specifically, an object thereof is to provide an information processing apparatus, an information processing method, a program, and a recording medium capable of proposing appropriate information to a user in a network printing technology.

In order to achieve the above-described object, an information processing apparatus according to an embodiment of the present invention is an information processing apparatus comprising a processor and implementing printing of an image sent from a first user by a second user side. The processor is configured to execute proposal processing of proposing information about an image to be sent to the second user, information about setting of the printing, or information about a material to be used for the printing to the first user or the second user based on a behavior history of the first user related to an image and a behavior history of the second user related to an image.

The processor may be configured to execute specification processing of specifying an attribute of the second user from the behavior history of the second user. In this case, in the proposal processing, the information corresponding to the attribute is suitably proposed to the first user or the second user.

The processor may be configured to execute estimation processing of estimating a relationship between the first user and the second user based on the behavior history of the first user and the behavior history of the second user. In this case, in the proposal processing, the information corresponding to the relationship is suitably proposed to the first user or the second user.

In the specification processing, psychographic attributes of the second user may be specified as the attribute of the second user. In this case, in the proposal processing, the information corresponding to the psychographic attribute based on the relationship among the psychographic attributes of the second user is suitably proposed to the first user or the second user.

A history related to printing of an image implemented by the first user side and a history related to transmission of an image to the second user from the first user may be included in the behavior history of the first user. A history related to printing of an image captured by the second user and a history related to printing of an image sent from the first user may be included in the behavior history of the second user.

A history related to transmission of an image to the first user from the second user may be further included in the behavior history of the second user.

The processor may be configured to further execute selection processing of selecting an image of a transmission candidate to the second user from an image group acquired by the first user based on the behavior history of the first user and the behavior history of the second user. In this case, in the proposal processing, the information about the image of the transmission candidate is suitably proposed to the first user or the second user.

In the selection processing, a plurality of corresponding images satisfying a preset condition may be specified from the image group, and the image of the transmission candidate may be selected from among the plurality of corresponding images.

In the selection processing, the plurality of corresponding images may be specified based on an imaging date and time of each image group.

The material may be a medium on which an image is printed. In the proposal processing, the information about a type of the medium to be used for the printing may be proposed to the first user or the second user.

More preferably, in the proposal processing, the information about the type of the medium corresponding to the image selected based on the behavior history of the first user and the behavior history of the second user from the image group acquired by the first user is suitably proposed to the first user or the second user.

An item of the information to be proposed in the proposal processing or an execution frequency of the proposal processing may be set based on the behavior history of the first user and the behavior history of the second user.

In order to solve the above-described problems, an information processing method according to an embodiment of the present invention is an information processing method for implementing printing of an image sent from a first user by a second user side. The method comprising executing proposal processing of proposing, by a processor, information about an image to be sent to the second user, information about setting of the printing, or information about a material to be used for the printing to the first user or the second user based on a behavior history of the first user related to an image and a behavior history of the second user related to an image.

The information processing method may further comprise estimation processing of estimating, by the processor, a relationship between the first user and the second user based on the behavior history of the first user and the behavior history of the second user. In this case, in the proposal processing, the information corresponding to the relationship is suitably proposed to the first user or the second user.

The information processing method may further comprise selection processing of selecting an image of a transmission candidate to the second user from an image group acquired by the first user based on the behavior history of the first user and the behavior history of the second user. In this case, in the proposal processing, the information about the image of the transmission candidate is suitably proposed to the first user or the second user.

In the information processing method, the material may be a medium on which an image is printed. In this case, in the proposal processing, the information about a type of the medium to be used for the printing is suitably proposed to the first user or the second user.

According to the present invention, it is possible to realize a program causing a computer to execute each processing included in the above-described information processing method. According to the present invention, it is possible to realize a recording medium having a program recorded thereon causing a computer to execute each processing included in the above-described information processing method.

According to the present invention, it is possible to propose appropriate information to the first user or the second user in the network printing in which the printing of the image sent from the first user is implemented on the second user side.

BRIEF DESCRIPTION OF THE DRAWINGS

FIG. 5B is a diagram showing an example (reception history) of a behavior history related to an image.

FIG. 5C is a diagram showing an example (transmission history) of a behavior history related to an image.

FIG. 5D is a diagram showing an example (printing history) of a behavior history related to an image.

FIG. 6 is a diagram of an information processing flow according to the embodiment of the present invention.

FIG. 8 is an explanatory diagram of a procedure for selecting an image of a transmission candidate.

DESCRIPTION OF THE PREFERRED EMBODIMENTS

Specific embodiments of the present invention will be described with reference to the drawings. However, the embodiments to be described below is merely an example for facilitating the understanding of the present invention and does not limit the present invention. The present invention may be modified or improved from the following embodiments without departing from the spirit of the present invention. The present invention includes an equivalent thereof.

In the present specification, the concept of "apparatus" includes a single apparatus that exhibits a specific function as a single apparatus, and includes a plurality of apparatuses that are present independently of each other in a distributed manner and exhibit a specific function in cooperation (collaboration) with each other.

In the present specification, an "image" is defined as image data unless otherwise specified. Examples of the image data include lossy compression image data such as a Joint Photographic Experts Group (JPEG) format, and lossless compression image data such as a Graphics Interchange Format (GIF) or Portable Network Graphics (PNG) format.

In the present specification, a "user" is a user who uses an information processing apparatus according to the embodiment of the present invention. Using the information processing apparatus means that a function of the information processing apparatus is used, and the function of the information processing apparatus is used from another apparatus (for example, a user terminal) in addition to directly operating the information processing apparatus.

In the present specification, attributes include demographic attributes and psychographic attributes. The demographic attributes include, for example, social status such as an age, a gender, an address, an occupation, and a family composition. The psychographic attributes include, for example, zests, preference (tastes), hobbies, interests, behavioral patterns, and tendencies to change consciousness or attitude.

About Configuration of Image Printing System

Figure 1:
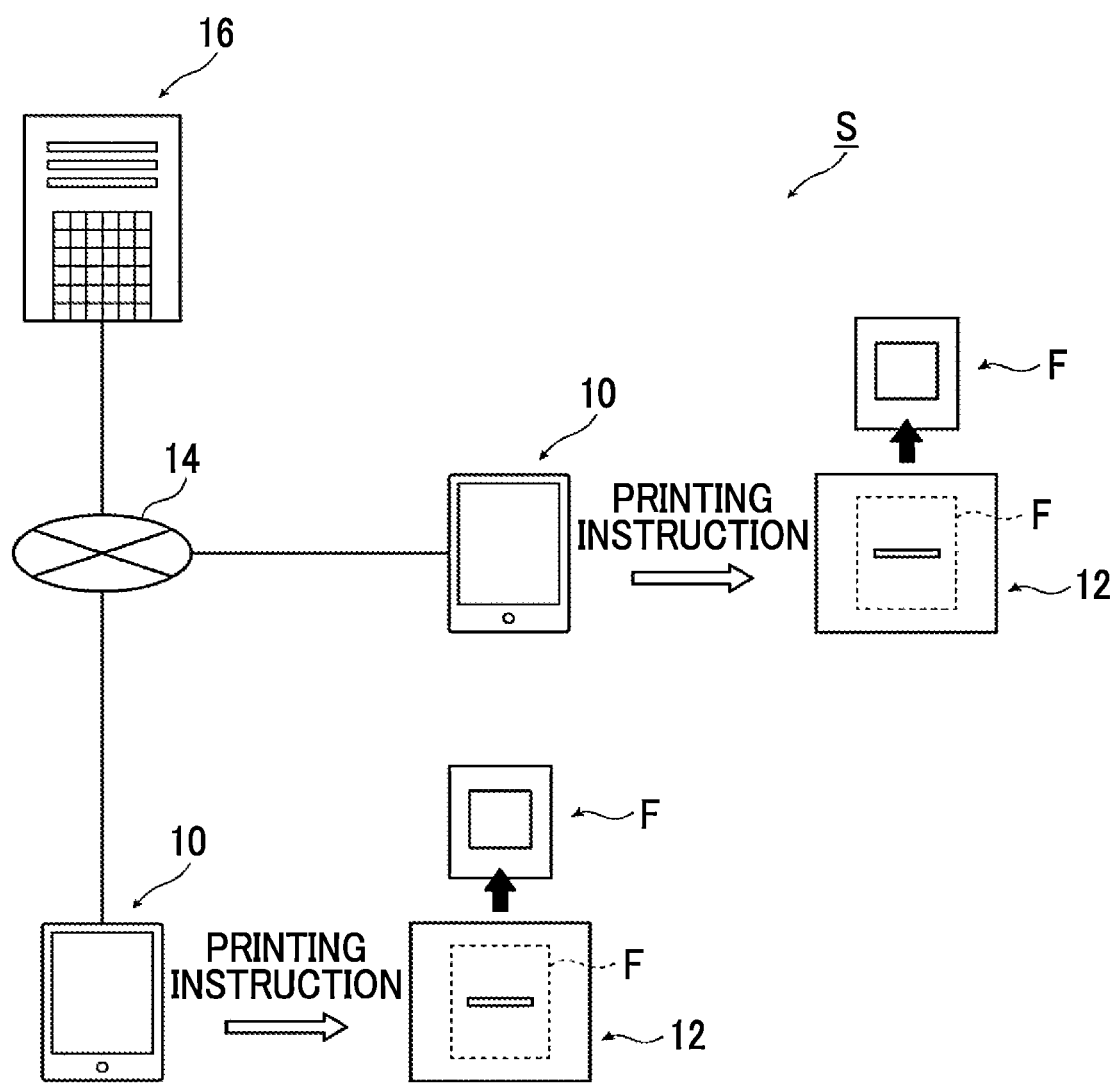
FIG. 1 is a diagram showing a configuration of an image printing system.

The present invention is an information processing technology related to transmission and reception of an image, printing, and the like, and is specifically applied to an image printing system S shown in FIG. 1. The image printing system S is a system for network printing in which an image is transmitted from one user to another user via a network and the image is printed on a user side that has received the image.

"Sending an image from a user" is synonymous with transmitting an image from a device used by the user. "Sending an image to a user" is synonymous with transmitting an image to a device used by the user. Examples of the device used by the user include user terminals 10 to be described below, and may include devices that can be used by logging in by inputting a password or account information of a device not owned by the user, such as a terminal installed in a store or the like.

The printing of the image in the present invention is, for example, an instant photographic printing method. Specifically, a photosensitive film F is exposed to form a latent image, and a developer pot provided at an end part of the film is broken to develop a developer in the pot on a film surface. Thus, an image in which the latent image is visualized is formed. The printing method is not limited to the instant photographic method, and may be an inkjet method, a sublimation-type thermal transfer method, an electrophotographic method using a toner, or the like.

The photosensitive film F is an example of a medium in which an image is formed on one surface (hereinafter, an image forming surface), is also called an instant color film, and is a film for a portable printer 12. There are a plurality of types of photosensitive films F, and a color (ground color), a design, a pattern, a figure, or the like of a frame region on the image forming surface is different for each type of the film. The frame region is a square frame-shaped region that surrounds a central region in which an image is formed on the image forming surface.

The image printing system S includes user terminals 10 and portable printers 12 used by the users, and a server computer 16 capable of communicating with the user terminals 10 via a network 14.

The user terminal 10 is a computer used by the user, and specifically, is a smartphone, a tablet terminal, a notebook personal computer (PC), or the like. The user terminal 10 includes a processor, a memory, and a communication interface. The user terminal 10 stores an application program (hereinafter, simply referred to as a terminal-side program) for using an image printing service provided by the server computer 16. The image printing service is a cloud service related to transmission and reception of an image, editing of an image, and printing of an image.

Each user may send an image owned by the user to another user, may edit the image, or may implement printing of the image by operating the user terminal 10 after starting the terminal-side program. The editing of the image is, for example, superimposing and disposing text information on an image before editing (hereinafter, referred to as an original image). As the printing of the image, the original image or the edited image may be printed, or collage printing may be implemented in which a plurality of images are combined and printed as one image. An example of the collage printing is to superimpose and print the original image or the edited image on a frame image (hereinafter, a template image) that decorates an edge part of an image forming region. The presence or absence of the template image in the printing and a type of the template image can be set by the user at the time of implementing the printing.

In a case where a camera is mounted on the user terminal 10, the user can capture an image by the user terminal 10. An imaging device such as a digital camera can be connected to the user terminal 10, and an image captured by the imaging device can be taken in the user terminal 10. As described above, the user can acquire the image, and the user acquires an image group consisting of two or more images by increasing the number of times the image is acquired.

The user terminal 10 can transmit one or more images selected by the user from the image group acquired by the user to the other user terminals 10. The image group acquired by the user may be stored in the server computer 16.

In the portable printer 12, an image (positive image) is printed in the image forming region of the photosensitive film F by accommodating an unused photosensitive film F in the printer and actuating an exposure head (not shown) and a transport mechanism (not shown) provided in the printer. The portable printer 12 is connected to the user terminal 10 by Wi-Fi (registered trademark) or Bluetooth (registered trademark) in a wireless manner. The portable printer 12 and the user terminal 10 may be connected in a wired manner.

The portable printer 12 implements a printing operation in response to a printing request from the user terminal 10. Specifically, in a case where the user designates an image to be printed (hereinafter, a target image) through the user terminal 10 and requests printing of the target image, the portable printer 12 prints the target image on the photosensitive film F.

For example, a plurality of photosensitive films F are sold as a set. The user opens a packaging box or the like and sets the set of photosensitive films F in the portable printer 12. Thereafter, whenever the printing of the image is implemented, the photosensitive films are consumed one by one, and the exposed and developed photosensitive film F is discharged to an outside of the portable printer 12. Immediately before a timing of moment at which the photosensitive films accommodated in the portable printer 12 are exhausted, a new set of photosensitive films F is set (replenished) in the portable printer 12.

In the above-described embodiment, the device (printer) for printing the image is the portable printer 12 owned by the user, but the present invention is not limited thereto. Any device can be used as long as the device can print the image. For example, a home-use printer set in the user's home may be used, or a store-installed printer that can be used in a case where the user visits a store or the like may be used. In the present specification, printing the image using the portable printer 12, the home-use printer, the store-installed printer, or the like is referred to as "printing an image on a user side".

The server computer 16 is a computer that provides a platform for an image printing service that is a cloud service. Specifically, the server computer 16 relays transmission and reception of an image between users, and also executes processing related to the printing of the image on the user (recipient) side that has received the image.

The server computer 16 stores information about a user who uses the image printing service, specifically, registration information of the user including a gender, an age, and the like, and a behavior history of the user about the image for each user. The behavior history of the user includes a reception history in which the user has received the image, a transmission history in which the user has transmitted the image, and a printing history in which the user has printed the image so far.

The information about the user including the behavior history and the like, may be stored in the user terminal 10 or the portable printer 12 of each user. In this case, the server computer 16 may acquire information about the user stored in the user terminal 10 by communicating with the user terminal 10.

The server computer 16 has a function of analyzing the information about the user and the image transmitted and received or printed by the user. The server computer 16 has a function of proposing, to the user, useful information regarding the transmission and reception of the image and the printing of the image by the user based on a result of the analysis. This function can be used by an application programming interface (API) mounted on the server computer 16. The user can confirm a proposal content from the server computer 16 on the user terminal 10 through the API.

Proposing information to the user, for example, means that information (specifically, data indicating information) is transmitted to the device used by the user and the information is output by the device. The method for outputting the information is not particularly limited, and for example, the information may be displayed on a screen of a display, or a voice corresponding to the information may be reproduced and emitted from a speaker or the like.

Transmission and Reception of Image and Printing of Image

Next, the transmission and reception of the image between the users and the printing of the image performed through the image printing service will be described with reference to FIG. 2. The following description mainly describes a graphical user interface (GUI) displayed on a screen of the user terminal 10.

Hereinafter, a case where the transmission and reception of the image are performed between two users will be described as an example, and one user will be referred to as a "first user" and the other user will be referred to as a "second user". The first user and the second user are relative concepts, and a user who was the first user at immediately before a timing of moment may be the second user immediately before a timing of moment.

Contents to be described below are not limited to a case where the transmission and reception of the image are performed between two users, and also in a case where one first user performs the transmission and reception of the image to and from a plurality of second users.

Both the first user and the second user download the terminal-side program from a predetermined site (for example, an introduction site of the image printing service) and install the program on the user terminal 10 in a case where the image printing service is used. In order to obtain (download) the terminal-side program, each of the first user and the second user may perform an input operation for account registration, such as a name, an age, and a gender. In this case, the input information may be stored in the server computer 16.

Figure 2:
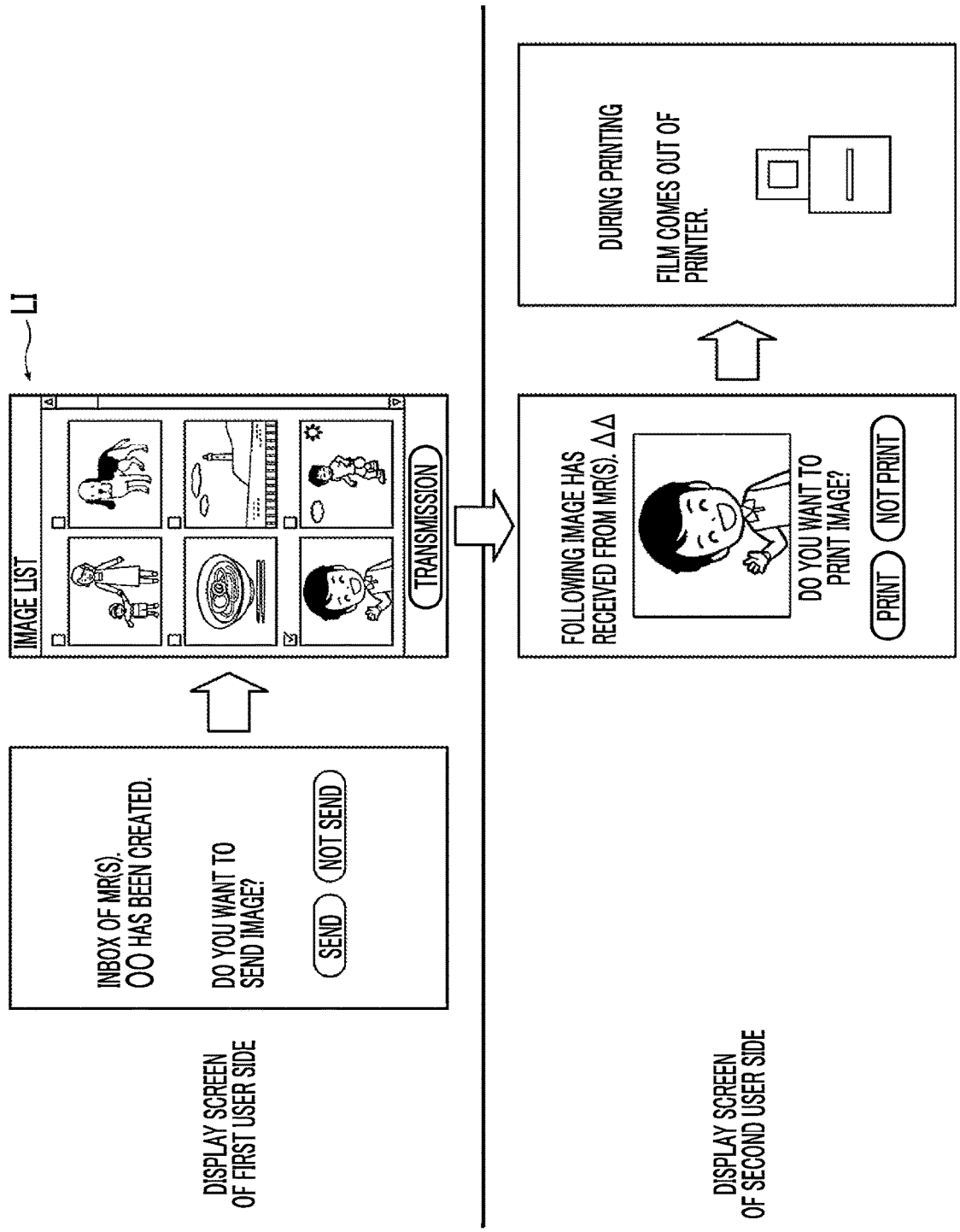
FIG. 2 is a diagram showing a procedure of image printing.

Thereafter, in a case where the second user starts the terminal-side program to create a folder for receiving the image (hereinafter, referred to as an inbox for the sake of convenience), the information is notified to the first user as shown in FIG. 2. In this case, a notification unit is not particularly limited, and for example, mail transmission or message posting via a social networking service (SNS) collaborated with the image printing service may be used.

In a case where a predetermined operation is performed after the first user starts the terminal-side program, a list LI of image groups owned by the first user is displayed on the user terminal 10 of the first user as shown in FIG. 2. The first user selects an image to be transmitted to the second user from the list LI, and performs an operation for image transmission (for example, an operation of pressing a transmission button). Accordingly, the image selected by the first user is transmitted to the user terminal 10 of the second user.

The image group owned by the first user (that is, a plurality of images displayed in the list LI) may be images stored in the user terminal 10 of the first user, or may be images uploaded to the server computer 16 and may be stored.

In a case where the image sent from the first user (hereinafter, received image) is received, the user terminal 10 of the second user stores the received image in the inbox and notifies the second user of information indicating that the image is received. The notification unit at this time is not particularly limited. The notification information may be displayed on a screen of the terminal-side program as shown in FIG. 2, or a notification lamp provided in the portable printer 12 used by the second user may be turned on and off.

The second user confirms a received image newly saved in the inbox through the screen of the terminal-side program, and performs an operation of requesting printing of the received image in a case where the second user wishes to print the received image (for example, an operation of pressing a printing button). Accordingly, an image to be printed and a print implementation request (printing command) are sent from the user terminal 10 of the second user to the portable printer 12 of the second user.

The portable printer 12 prints the received image on the photosensitive film F in response to a printing request. By the printing operation of the portable printer 12, the second user can acquire the photosensitive film F on which the image (received image) sent from the first user is printed.

In a case where the printing of the image on the second user side is completed, information indicating that the printing is completed may be notified to the first user.

The above procedure is an example of a case where an image is transmitted from the first user to the second user and the image is printed on the second user side. However, the same applies to a procedure in a case where an image is transmitted from the second user to the first user and the image is printed on the first user side. That is, the image may be sent to each other (bidirectionally) between the first user and the second user.

Configuration of Information Processing Apparatus According to Embodiment of Present Invention The information processing apparatus according to the embodiment of the present invention is a computer, for example, the server computer 16. The number of computers constituting the information processing apparatus may be one or two or more. That is, the information processing apparatus is realized by a processor and a program on which the processor can be executed, and is, for example, a general-purpose computer.

Figure 3:
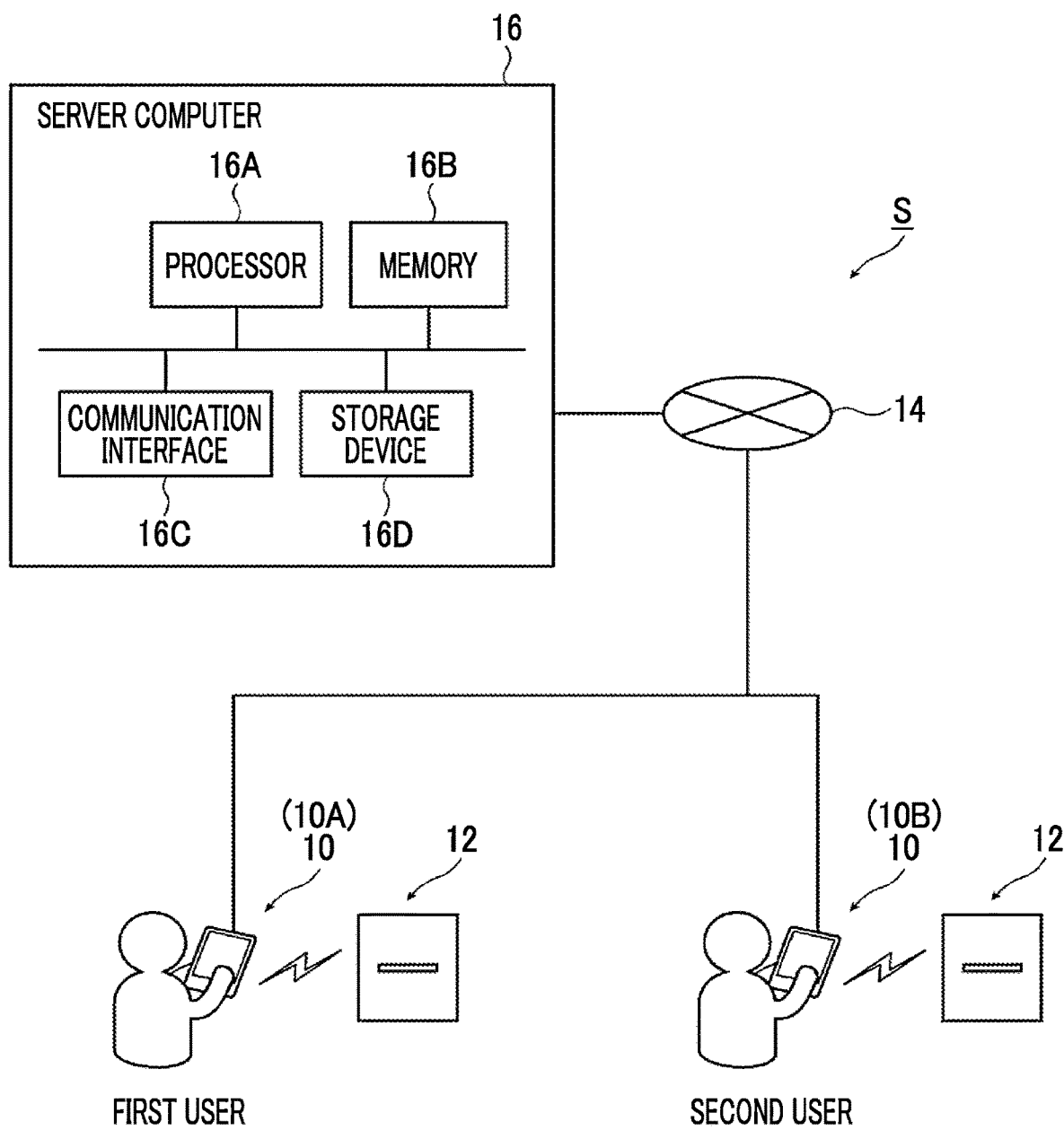
FIG. 3 is a diagram showing a hardware configuration of an information processing apparatus according to an embodiment of the present invention.

As shown in FIG. 3, the server computer 16 constituting the information processing apparatus includes a processor 16A, a memory 16B, a communication interface 16C, a storage device 16D, and the like.

The processor 16A is, for example, a central processing unit (CPU), a graphics processing unit (GPU), a digital signal processor (DSP), a tensor processing unit (TPU), or the like.

The memory 16B is, for example, a semiconductor memory such as a read only memory (ROM) and a random access memory (RAM).

The communication interface 16C is, for example, a network interface card, a communication interface board, or the like.

The storage device 16D is, for example, a storage built in or external to the server computer 16. However, the present invention is not limited thereto, and the storage device 16D may be a third computer (for example, an external server) capable of communicating with the server computer 16.

A program (hereinafter, a server-side program) for causing the server computer to function as the information processing apparatus according to the embodiment of the present invention is installed in the server computer 16. The server-side program is a program for causing a computer to execute each processing included in an information processing method according to the embodiment of the present invention. That is, the processor 16A reads out and executes the server-side program, and thus, the server computer 16 can provide the image printing service.

The server-side program may be acquired by being read from a recording medium readable by a computer, or may be acquired by being received (downloaded) through a communication line such as the Internet or an intranet.

Figures 4, 5A:
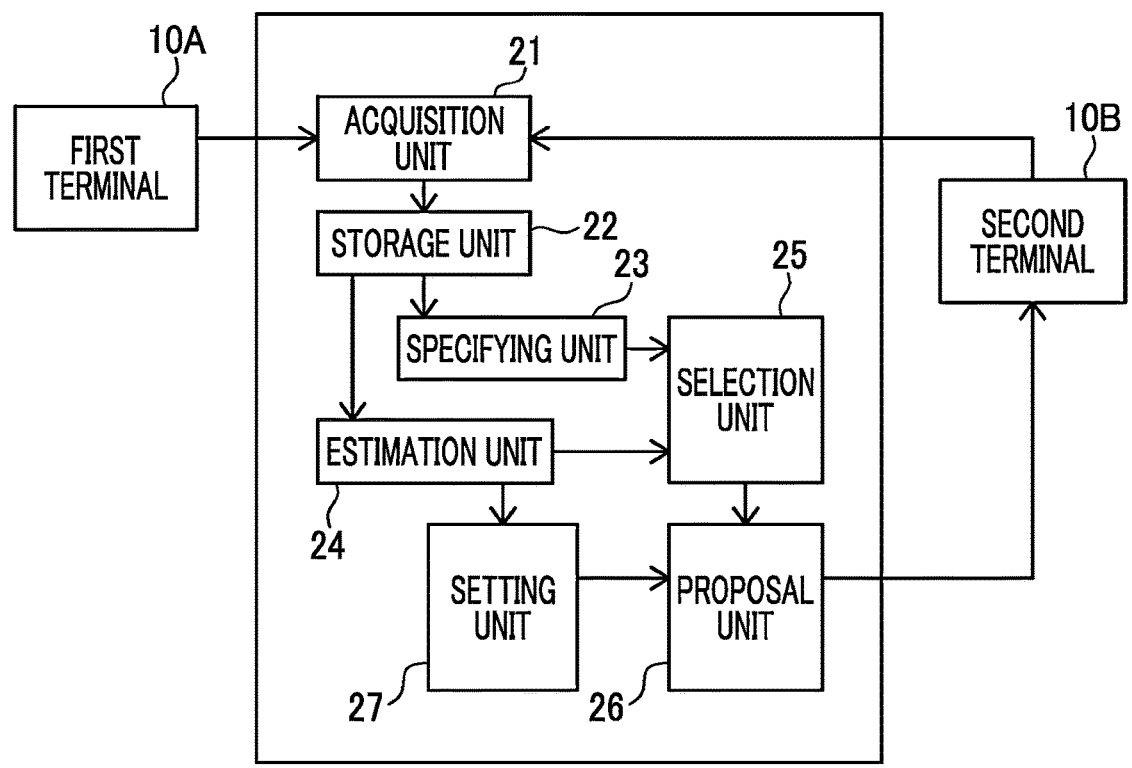
FIG. 4 is a diagram showing a function of the information processing apparatus according to the embodiment of the present invention.
FIG. 5A is a diagram showing an example (imaging history) of a behavior history related to an image.

A configuration of the server computer 16 constituting the information processing apparatus will be described again from a functional aspect. As shown in FIG. 4, the server computer 16 includes an acquisition unit 21, a storage unit 22, a specifying unit 23, an estimation unit 24, a selection unit 25, a proposal unit 26, and a setting unit 27. These functional units are realized by cooperation between a hardware device included in the server computer 16 and software including the above-described server-side program.

Hereinafter, each functional unit will be described. Hereinafter, a case where an image sent from the first user is printed on the second user side will be described. In the following description, the user terminal 10 of the first user will be referred to as a "first terminal 10A", and the user terminal 10 of the second user will be referred to as a "second terminal 10B".

Acquisition Unit

The acquisition unit 21 acquires registration information and a behavior history related to the image for each of the first user and the second user. The registration information of each user includes a gender, an age, and the like of each user, and is input through the user terminal 10 in a case where each user starts using the image printing service. The acquisition unit 21 acquires the input registration information from the first terminal 10A and the second terminal 10B.

The behavior history related to the image includes a history related to image capturing (imaging history), a history related to image reception (reception history), a history related to image transmission (transmission history), and a history related to printing of the image (printing history).

As shown in FIG. 5A, the imaging history is information including a subject, an imaging scene, a user who is a photographer, an imaging date and time, and the like appearing in the captured image. An acquisition method and an acquisition timing of the imaging history are not particularly limited. For example, in a case where a user captures an image by using the user terminal 10, the acquisition unit 21 may acquire a history (record) of one imaging from the user terminal 10.

As shown in FIG. 5B, the reception history includes a subject appearing in the received image, an imaging scene of the received image, a user who is a recipient, a user who is a transmission source of the received image, an imaging date and time of the received image, and the like. An acquisition method and an acquisition timing of the reception history are not particularly limited. For example, in a case where a user receives an image on the user terminal 10, the acquisition unit 21 may acquire a history (record) of one image reception from the user terminal 10.

As shown in FIG. 5C, the transmission history includes a subject appearing in a transmitted image, an imaging scene of the transmitted image, a user who is a sender, a user who is a transmission destination of the transmitted image, an imaging date and time of the transmitted image, and the like. As for an acquisition method and an acquisition timing of the transmission history, for example, in a case where a user transmits an image on the user terminal 10, the acquisition unit 21 may acquire a history (record) for one image transmission from the user terminal 10.

As shown in FIG. 5D, the printing history includes a subject appearing in a printed image, an imaging scene of the image, a user who has performed the printing, a user who is a provider of the printed image, the number of times of printing, an imaging date and time of the image, and the like. An acquisition method and an acquisition timing of the printing history are not particularly limited. For example, in a case where the user operates the user terminal 10 to print an image, the acquisition unit 21 may acquire a history (record) of one printing from the user terminal 10. The printing history may be acquired from the portable printer 12 that has printed the image.

Incidentally, the subject and the imaging scene appearing in the image can be specified by applying a known subject recognition technology and a known scene recognition technology to analyze the image. The analysis of the image may be performed on the user terminal 10 side or on the server computer 16 side. In a case where the subject and the imaging scene appearing in the image are specified, a specification result may be attached to the image as tag information. For the image to which the tag information is attached, the above-described various behavior histories can be easily acquired.

The acquisition unit 21 acquires, as the behavior history of the first user, a history related to printing of an image implemented by the first user side (printing history) and a history related to transmission of an image from the first user to the second user (transmission history).

The acquisition unit 21 may further acquire, as the behavior history of the first user, a history related to capturing of an image by the first user (imaging history) and a history related to reception of an image sent from the second user (reception history).

The acquisition unit 21 acquires, as the behavior history of the second user, a history related to printing of an image captured by the second user (printing history) and a history related to printing of an image sent from the first user (printing history).

The acquisition unit 21 may further acquire, as the behavior history of the second user, a history related to transmission of an image from the second user to the first user (transmission history).

Storage Unit

The storage unit 22 stores the behavior history (specifically, the behavior history related to the image) of each of the first user and the second user acquired by the acquisition unit 21. The behavior history of each user may be stored in the user terminal 10 of each user. In this case, the behavior history of each user from the user terminal 10 may be read out as necessary by communicating with the user terminal 10 of each user.

The image captured by each of the first user and the second user may be stored in the storage unit 22. Alternatively, the image transmitted by one of the first user and the second user to the other may be stored in the storage unit 22.

Specifying Unit

The specifying unit 23 executes specification processing and specifies attributes of each of the first user and the second user based on the behavior histories of the first user and the second user acquired by the acquisition unit 21. As the attributes specified in the specification processing, demographic attributes such as an age and a family composition, and psychographic attributes such as a hobby and a preference. The preference (taste) is a preference for a specific target, and examples of a preference target include a person, an object, an event, and the like. Examples of a person as the preference target include his or her own children or grandchild. Examples of the object as the preference target include landscapes such as mountains and the sea, and scenes such as daytime and evening. Examples of the event as the preference target include planning and special events such as travel, athletic meet, fireworks, and the like. The event as the preference target specified in the specification processing is an event that can be estimated from the object.

In the specification processing, the specifying unit 23 specifies demographic attributes and psychographic attributes for the first user from the printing history of the first user. For example, in a case where the first user prints an image of a child on a daily basis, the specifying unit specifies that the first user is a parent generation and a preference (interest) of the first user is the child. In a case where the first user frequently prints images of pets and cooking, the specifying unit specifies that hobbies of the first user are the pet and the cooking.

In the specification processing, the specifying unit 23 specifies demographic attributes and psychographic attributes of the second user from the printing history of the second user. For example, in a case where the second user prints many images of landscapes of a travel destination and an elderly person frequently appears in the printed images, the specifying unit specifies that the second user is in a senior age and a preference of the second user is traveling. In a case where the second user of a senior generation frequently prints the image of the child, the specifying unit specifies that the preference (interest) of the second user is the child, strictly speaking, his or her grandchild.

A method for specifying the attribute from the behavior history is not particularly limited. For example, machine learning may be performed on a behavior tendency of a person with a certain attribute (specifically, a behavior tendency related to an image). In this case, a correspondence relationship between the behavior history and the attribute may be grasped from a result of the machine learning, and the attribute from the behavior history may be specified based on the correspondence relationship.

Estimation Unit

The estimation unit 24 executes estimation processing and estimates a relationship between the first user and the second user based on the behavior histories of the first user and the second user acquired by the acquisition unit 21.

Specifically, in the estimation processing, the estimation unit 24 refers to the transmission history of the first user and the printing history of the second user. Here, the transmission history of the first user is the history related to the transmission of the image from the first user to the second user, and the printing history of the second user is the history related to the printing of the image sent from the first user. The estimation unit 24 estimates a relationship between the first user and the second user based on the transmission history of the first user and the printing history of the second user. At this time, the estimation unit 24 takes into consideration the attributes (age, preference, and the like) of the first user and the second user specified by the specifying unit 23.

For example, the first user periodically transmits the image of the child to the second user, and the second user frequently prints the image of the child sent from the first user. In this case, the estimation unit 24 estimates that the relationship between the first user and the second user is a relationship between the parent and the grandparent.

In a case where the first user and the second user send images to each other, in the estimation processing, the estimation unit 24 estimates the relationship between the first user and the second user based on the transmission history and the reception history of the first user and the printing history of the second user. Here, the reception history of the first user is the history related to the reception of the image sent from the second user. For example, the first user and the second user send images of the same soccer team to each other, and the second user frequently prints the images of the soccer team. In this case, the estimation unit 24 estimates that the relationship between the first user and the second user is between fans of the soccer team.

A method for estimating the relationship between the users from the behavior history is not particularly limited. For example, some patterns may be set in advance for the relationship between the users, and a condition for the behavior history may be determined for each pattern. In a case where the behavior history satisfies the condition of any of the patterns, a relationship between the patterns may be estimated to be the relationship between the users.

The estimation unit 24 may take into consideration a transmission and reception frequency, a printing frequency, and the number of prints of the image, and the like between the users in a case where the relationship between the users is estimated. For example, the estimation unit 24 may estimate that the relationship between the users is deeper as the transmission and reception frequency is higher. The estimation unit 24 may place importance on an image content (specifically, the subject and the imaging scene) in which the printing frequency or the number of prints is large in a case where the relationship between the users is estimated.

The estimation unit 24 may take into consideration registration information (specifically, a gender, an age, and the like) of each user in addition to the behavior history of each user in a case where the relationship between the users is estimated. In a case where the image printed by the second user is the edited image, for example, an image to which a text message is attached, the estimation unit 24 may take into consideration a content of the text message in a case where the relationship between the users is estimated.

Selection Unit

The selection unit 25 executes selection processing and selects an image of a transmission candidate to the second user from the image group acquired by the first user based on the behavior history of the first user and the behavior history of the second user.

Specifically, the selection unit 25 selects the image of the transmission candidate based on the relationship between the users estimated by the estimation unit 24 and the attributes of the second user specified by the specifying unit 23. Here, the attributes of the second user are psychographic attributes, specifically, preferences and hobbies, and the like, and more specifically, preferences, hobbies, and the like based on the relationship between the users.

For example, the preference of the second user is specified to be "child (grandchild)" and "pet", and the relationship between the first user and the second user is estimated to be the relationship between the parent and the grandparent. In this case, the preference of the second user based on the relationship between the first user and the second user is "child (grandchild)". As a result, the selection unit 25 selects, as the image of the transmission candidate to the second user, images of a child (specifically, images of a child that has not yet been sent to the second user) from the image group acquired by the first user.

The preference of the second user is specified as "specific soccer team" and "cooking", and the relationship between the first user and the second user is estimated to be between the fans of the same soccer team. In this case, the preference of the second user based on the relationship between the first user and the second user is "specific soccer team". As a result, the selection unit 25 selects, as the image of the transmission candidate to the second user, images of a soccer team (specifically, images that have not yet been sent to the second user) from the image group acquired by the first user.

In the above-described case, the first user and the second user send images to each other. In this case, in the image group acquired by the second user, the selection unit 25 may select, as an image of a transmission candidate to the first user, images of a soccer team (specifically, images not yet acquired by the first user) of the image group acquired by the second user.

The selection unit 25 may specify a plurality of corresponding images satisfying a preset condition from the image group acquired by the first user, and may select the image of the transmission candidate from among the plurality of corresponding images. Specifically, the selection unit 25 identifies an imaging date and time of each of each image group acquired by the first user. The imaging date and time of each image can be identified from, for example, tag information in an exchangeable image file format (EXIF) format attached to the image.

The selection unit 25 specifies a plurality of corresponding images based on subjects and imaging scenes of images captured on the same imaging date or two or more consecutive imaging days. For example, an important event such as a birthday of a child of the first user or an athletic meet of the child is held, and the first user captures a plurality of images (specifically, images of the child) on an event day. The selection unit 25 may specify, as the corresponding images, a plurality of images captured on the event day, and may select an image of a transmission candidate to the grandparent who is the second user from among the plurality of the corresponding images.

In the above-described embodiment, although the images captured on the same imaging date or on two or more consecutive imaging dates are specified as the corresponding images based on the imaging date and time of each image group acquired by the first user, the present invention is not limited thereto. For example, in the above-described image group, images in which a subject with a highest appearance frequency appears may be specified as the corresponding images.

A condition for specifying the corresponding images may be set in advance, and more specifically, may be set before specifying the corresponding images. The above-described condition may be automatically set by the function of the server computer 16 or may be set based on the input of the first user or the second user.

Proposal Unit

The proposal unit 26 executes proposal processing and proposes information about printing on the second user side to the first user or the second user based on the behavior history of the first user and the behavior history of the second user. The information proposed by the proposal unit 26 is information about the image sent from the first user to the second user, information about a setting of the printing, or information about a material to be used for the printing. The proposal unit 26 may propose any one or two of these three kinds of information, or all the three kinds of information to the first user or the second user.

Hereinafter, although the case where information is proposed to the first user will be described as an example, contents to be described below can be similarly applied to a case where information is proposed to the second user.

The information about the image transmitted from the first user to the second user (hereinafter, proposed image information) is information about the image of the transmission candidate selected by the selection unit 25. Here, the image of the transmission candidate is selected based on the behavior history of the first user and the behavior history of the second user as described above, and more specifically, are selected depending on the psychographic attributes (preferences) of the second user based on the relationship between the users. That is, the proposed image information is information corresponding to the relationship between the users and the psychographic attributes of the second user.

The information about the setting of the printing (hereinafter, proposed setting information) includes, for example, information about a setting in a case where collage printing is performed by using the image sent from the first user, for example, a type of a template image to be used for the collage printing.

The information about the material to be used for printing (hereinafter, proposed material information) includes information about a type of the photosensitive film F to be used for printing the image sent from the first user, for example.

Here, the type of the photosensitive film F to be proposed correspond to the image of the transmission candidate selected by the selection unit 25, that is, an image selected based on the behavior history of the first user and the behavior history of the second user.

Specifically, the subjects and the imaging scenes of the images are classified into several categories, the type of the photosensitive film F suitable for each category is determined in advance, and a correspondence relationship between the categories and the film types is defined as a lookup table (LUT). From this LUT, the type of the photosensitive film F corresponding to the category to which the image of the transmission candidate belongs is specified. However, the present invention is not limited thereto, and for example, machine learning may be implemented on a correspondence relationship between the subject and the imaging scene of the printed image and the type of the photosensitive film F used for the printing. In this case, the type of the photosensitive film F corresponding to the image of the transmission candidate may be specified by using the result of the machine learning.

Setting Unit

The setting unit 27 executes setting processing, and sets an item of information proposed by the proposal unit 26 to the first user in the proposal processing, or an execution frequency of the proposal processing. Setting the item of the information means that information to be proposed is set among the proposed image information, the proposed setting information, and the proposed material information. The setting unit 27 may set both the item of the information to be proposed and the execution frequency of the proposal processing.

In the setting processing, the setting unit 27 sets the item of the information to be proposed or the execution frequency of the proposal processing based on the behavior history of the first user, the behavior history of the second user, and more specifically, the relationship between the users estimated from the behavior history of each user. For example, in a case where the relationship between the users is a relationship between the parent and the grandparent, the setting unit 27 sets, as the item of the information to be proposed, the proposed image information and the proposed material information.

In a case where the relationship between the users is a friend relationship, the setting unit 27 sets the execution frequency of the proposal processing to be relatively low. On the other hand, in a case where the relationship between the users is the relationship between the parent and the grandparent, the setting unit 27 sets the execution frequency of the proposal processing to be relatively high.

A procedure for setting the execution frequency of the proposal processing is not particularly limited. For example, the relationship between the users may be divided into some patterns, the execution frequency may be determined in advance for each pattern, and a correspondence relationship between the pattern and the execution frequency may be stored as the LUT. In this case, the execution frequency corresponding to the relationship between the users may be set from the LUT. However, the present invention is not limited thereto, and machine learning may be implemented on the correspondence relationship between the pattern and the execution frequency, and the execution frequency corresponding to the relationship between the users may be set based on the result of the machine learning.

Information Processing Flow According to Embodiment of Present Invention

An information processing flow (hereinafter, proposed flow) by the information processing apparatus according to the embodiment of the present invention will be described. In the proposed flow, the information processing method according to the embodiment of the present invention is adopted. In other words, each step in the proposed flow corresponds to a component of the information processing method according to the embodiment of the present invention.

The proposed flow proceeds in a flow shown in FIG. 6, and each step in the flow is executed by the processor of the computer (for example, server computer 16) constituting the information processing apparatus.

Hereinafter, in order to easily understand the description, a case where the first user is a user A, the second user is users B and C, and the user A sends an image to the users B and C will be described as an example.

The proposed flow is implemented, for example, based on an intention of the user A or the like. For example, in a case where the user A performs a predetermined operation on the first terminal 10A, the proposed flow is started with this operation as a trigger. However, the present invention is not limited thereto, and the proposed flow may be periodically implemented at regular intervals.

In the proposed flow, first, the processor acquires the behavior history related to the image, specifically, the imaging history, the reception history, the transmission history, and the printing history for each of the users A, B, and C (S001).

Subsequently, the processor executes the specification processing and specifies the attributes of each of the users A, B, and C based on the behavior history acquired in step S001 (S002). In this step S002, the attributes, specifically, an age, a preference, and the like of each user are specified based on the printing history of each user. For example, it can be seen that the user A frequently prints an image of a child and an image of cooking from the printing history of the user A. In this case, regarding the attributes of the user A, the user A is specified as the parent generation and the preference (interest) is specified as the child and the cooking.

Similarly, in this step S002, the attributes of each of the users B and C are specified from the printing histories of the users B and C. Hereinafter, regarding the attributes of the user B, the user B is specified as the senior age and the preference is specified as traveling and the child (grandchild). Regarding the attributes of the user C, the user C is specified as the parent generation and the preference is specified as cooking.

Figure 7:
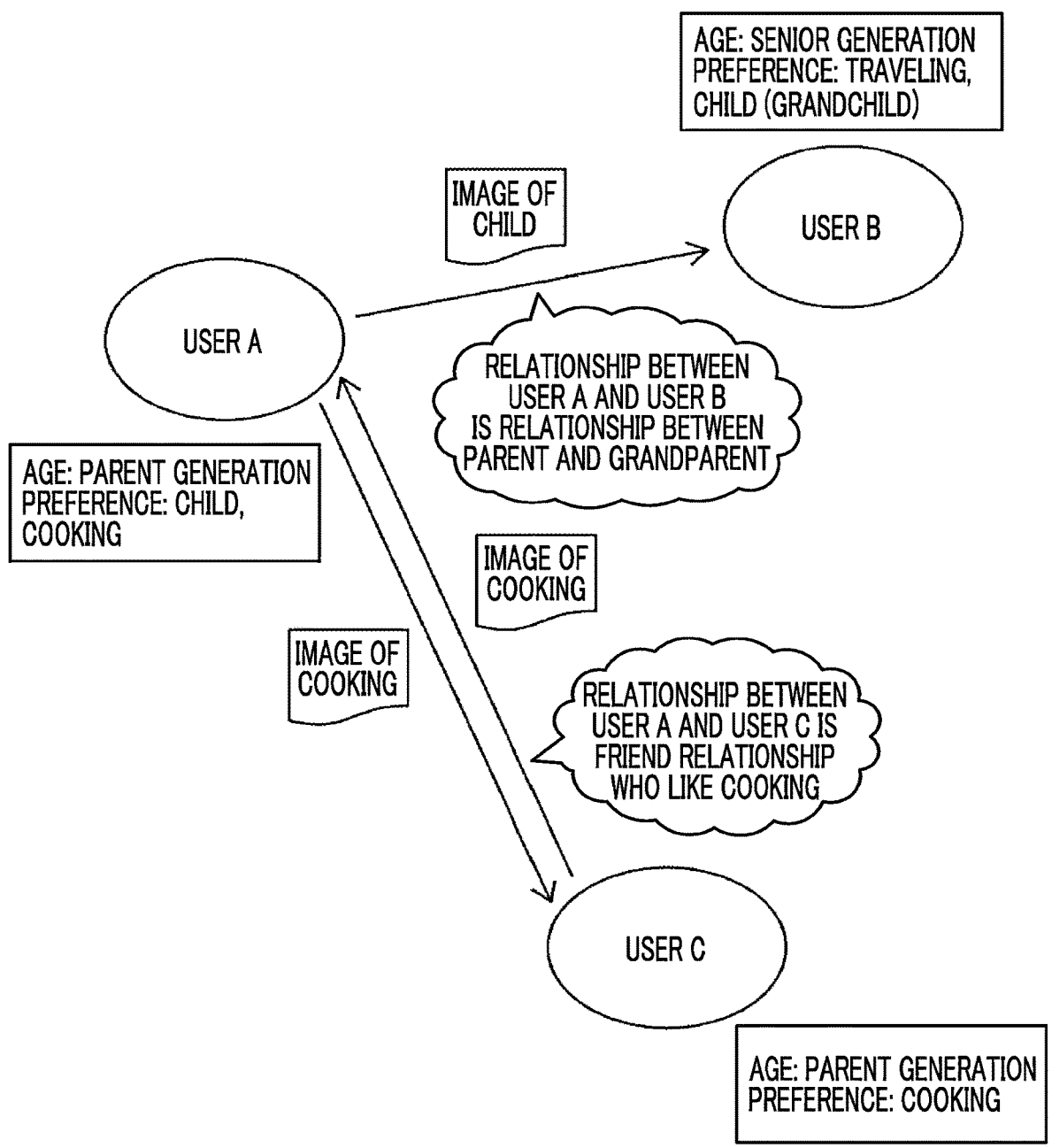
FIG. 7 is a diagram showing an estimation result of a relationship between users.

Subsequently, the processor executes the estimation processing and estimates a relationship between the user A and the user B and a relationship between the user A and the user C based on the behavior history of each user acquired in step S001 (S003). To describe this step S003 in an easy-to-understand manner, it is assumed that the user A unilaterally sends an image to the user B. In this case, the relationship between the user A and the user B is estimated based on the history related to the transmission of the image from the user A to the user B and the history related to the printing of the image transmitted from the user A on the user B side. At this time, the attributes (ages, preferences, and the like) of the users A and B specified in step S002 are taken into consideration. For example, the user A periodically transmits the image of the child to the user B, and the user B frequently prints the image of the child sent from the user A. In this case, the relationship between the user A and the user B is estimated to be a relationship between the parent and the grandparent, as shown in FIG. 7.

On the other hand, in a case where a case where the user A and the user C send images to each other is assumed, in this case, the relationship between the first user and the second user is estimated based on the transmission history and the reception history of the user A and the printing history of the user C. At this time, the attributes (ages, preferences, and the like) of the users A and C specified in step S002 are taken into consideration. For example, the user A and the user C send images of the cooking to each other, and the user C prints the images of the cooking frequently. In this case, the relationship between the user A and the user C is estimated to be between friends who like cooking, as shown in FIG. 7.

Thereafter, the processor executes the selection processing and selects the image of the transmission candidate from the image group acquired by the user A based on the behavior history of each user (S004). In this step S004, the image of the transmission candidate is selected for each of the users B and C. The image of the transmission candidate to the user B is selected based on the relationship between the user A and the user B estimated in step S003 and the attributes (preferences) of the user B specified in step S002. More specifically, the image of the transmission candidate to the user B is selected based on the preference of the user B based on the relationship between the user A and the user B. For example, in a case where the preference of the user B based on the relationship between the user A and the user B is "child (grandchild)", as shown in FIG. 8, in the image group of the user A, the image of the child is selected as the image of the transmission candidate to the user B.

Similarly, the image of the transmission candidate to the user C is selected based on the preference of the user C based on the relationship between the user A and the user C. For example, in a case where the preference of the user C based on the relationship between the user A and the user C is "cooking", as shown in FIG. 8, in the image group of the user A, the image of the cooking is selected as the image of the transmission candidate to the user C.

In step S004, the processor may identify the imaging date and time of each image group of the user A, and may specify the plurality of corresponding images based on the subjects and the imaging scenes of the images captured on the same imaging date or two or more consecutive imaging dates. For example, an important event such as a birthday of a child of the user A or an athletic meet of the child is held, and the user A captures a plurality of images on an event day. In this case, a plurality of images captured on the event day may be specified as the plurality of corresponding images, and an image of a transmission candidate to the user B may be selected from among the plurality of corresponding images.

Subsequently, the processor executes the setting processing, and sets the item of information to be proposed in the subsequent proposal processing or the execution frequency of the proposal processing (S005). In this step S005, the item of the information to be proposed or the execution frequency of the proposal processing is set based on the behavior history of each user, and more specifically, the relationship between the users estimated in step S003. For example, the relationship between the user A and the user B is the relationship between the parent and the grandparent. In this case, the proposed image information and the proposed material information are proposed, and the execution frequency of the proposal processing is set to be relatively high. On the other hand, the relationship between the user A and the user C is the friend relationship. In this case, the proposed image information is proposed, and the execution frequency of the proposal processing is set to be relatively low.

Subsequently, the processor executes the proposal processing and proposes the information of the item set in step S005 to the user A (S006). In this step S006, the proposal of the information is performed for each of the users B and C according to the setting contents in step S005.

Specifically, regarding the user B, the information about the image of the transmission candidate to the user B selected in step S004 and the information about the type of the photosensitive film F corresponding to the image of the transmission candidate are proposed to the user A. On the other hand, regarding the user C, the information about the image of the transmission candidate to the user C selected in step S004 is proposed to the user A.

The proposal processing is executed at an implementation frequency set in step S005 for each of the users B and C. That is, the proposal processing is executed with a relatively high frequency for the user B, and the proposal processing is executed with a relatively low frequency for the user C.

The proposed flow described above is ended, for example, immediately before a timing of moment at which the user A performs an operation of requesting the end of the flow.

About Efficacy of Embodiment of Present Invention

In the embodiment of the present invention, predetermined information can be proposed to the first user in network printing in which the second user side implements printing of an image sent from the first user. Specifically, it is possible to propose the information about the images sent to the second user, specifically, the information about the image of the transmission candidate (proposed image information) to the second user. Accordingly, the first user who is an image sender can appropriately determine the image to be sent to the second user who is an image transmission destination based on the proposed information. As a result, it is possible to promote the use of the network printing.

In the embodiment of the present invention, it is possible to propose the information about the setting of the printing, for example, the presence or absence of the collage printing, and the setting of the type of the template image to be used for collage printing (proposed setting information). Accordingly, the first user who is the image sender can grasp the template image suitable for having the second user of the image transmission destination perform the collage printing. As a result, the first user can transmit, for example, a composite image obtained by combining the template image and the original image to the second user.

In the embodiment of the present invention, it is possible to propose the information about the type of the material to be used for the printing, for example, the photosensitive film F (proposed material information). Accordingly, the first user who is the image sender can grasp the type of the photosensitive film F suitable for having the second user of the image transmission destination print the image, and can present, for example, the photosensitive film F to the second user. As a result, it is possible to further promote the use of the network printing.

The above-described effect is especially effective in a case where the second user who is not accustomed to purchasing the photosensitive film F or a person who lives in a place where it is difficult to purchase the photosensitive film F and causes the person to print the corresponding image.

In the embodiment of the present invention, the above-mentioned proposal information (proposed image information, proposed setting information, and proposed material information) can be proposed to the second user who is the image transmission destination. Accordingly, for example, the image to be provided from the first user to the second user (that is, image of the transmission candidate) can be notified to the second user, and the second user can request the image to the first user.

The information to be proposed is determined based on the behavior history of the first user related to the image and the behavior history of the second user related to the image. Accordingly, appropriate information can be proposed to the first user or the second user in consideration of the behavior history of each of the first user and the second user.

Here, the behavior history of the first user suitably includes the history related to the printing of the image implemented by the first user side and the history related to the transmission of the image from the first user to the second user. The behavior history of the second user suitably includes the history related to the printing of the image captured by the second user and the history related to the printing of the image sent from the first user.

In the above-described case, the attributes of each user, particularly the psychographic attributes such as a preference can be specified from the behavior history of each user. As a result, for example, the image of the transmission candidate to the second user can be selected based on the preference of the second user and the like, and the information about the image can be proposed to the first user or the second user.

The behavior history of the second user may further include the history related to the image transmission from the second user to the first user. That is, in a case where the first user and the second user send images to each other, this fact may be reflected in the behavior history of the second user. Accordingly, it is possible to select the image of the transmission candidate to the second user while taking into consideration that the image is bidirectionally transmitted and received between the users.

In the embodiment of the present invention, the relationship between the first user and the second user is estimated from the behavior history of each of the first user and the second user. The image of the transmission candidate to the second user is selected based on the preference of the second user based on the estimated relationship. Accordingly, the images corresponding to the preference of the second user can be selected as the transmission candidate while taking into consideration the relationship between the users. As a result, the use of the network printing can be further promoted.

In the embodiment of the present invention, the imaging date and time of each image group acquired by the first user is identified, and for example, a plurality of images captured on the same imaging date and time or two or more consecutive imaging dates and times (corresponding image) are specified. The image of the transmission candidate to the second user is selected from among the plurality of corresponding images. Accordingly, for example, images of an important event can be extracted from the image group of the first user, and the image of the transmission candidate can be selected from among the extracted images.

In the embodiment of the present invention, the item of the information to be proposed in the proposal processing or the execution frequency of the proposal processing is set based on the estimation result of the relationship between the first user and the second user. Accordingly, the proposal content or the number of times of proposals can be adjusted depending on the relationship between the users (specifically, a depth of the relationship or the like).

Other Embodiments

The embodiment described above is a specific example given to describe the information processing apparatus and the information processing method according to the embodiment of the present invention in an easy-to-understand manner, and is merely an example. Other embodiments can be considered.

In the above-described embodiment, the image transmitted from the first user to the second user is received by the user terminal 10 (second terminal 10B) of the second user, but the present invention is not limited thereto. For example, the portable printer 12 of the second user may directly receive the image sent from the first user.

In the above-described embodiment, the attributes such as the preference of each user are specified from the behavior history of each of the first user and the second user, and the relationship between the users is estimated. The information corresponding to the relationship between the users and the attributes of the users is proposed to the first user. However, the present invention is not limited thereto, and the processing of estimating the relationship between the users may be omitted. That is, the information to be proposed to the first user may be determined only depending on the attributes (preferences) of the users without taking into consideration the relationship between the users.

In the above-described embodiment, although the function of the information processing apparatus according to the embodiment of the present invention is exhibited by the processor provided in the server computer, the present invention is not limited thereto. The processor included in the information processing apparatus according to the embodiment of the present invention may be included in the user terminal 10 or the portable printer 12 on the user side. That is, a part or all of the above-described functional units provided in the information processing apparatus according to the embodiment of the present invention may be included in the user terminal 10 or the portable printer 12.

The processor included in the information processing apparatus according to the embodiment of the present invention includes various processors. The various processors include, for example, a CPU that is a general-purpose processor that functions as various processing units by executing software (program).

Various processors include a programmable logic device (PLD) which is a processor capable of changing a circuit configuration after manufacturer, such as a field programmable gate array (FPGA).

A dedicated electric circuit which is a processor having a circuit configuration specifically designed to perform specific processing such as an application specific integrated circuit (ASIC) is also included in the various processors.

One processing unit of the information processing apparatus according to the embodiment of the present invention may be constituted by one of the various processors, or may be constituted by a combination of two or more processors of the same type or different types, for example, a combination of a plurality of FPGAs or a combination of a CPU and an FPGA.

A plurality of functional units included in the information processing apparatus according to the embodiment of the present invention may be constituted by one of various processors, or may be constituted by one processor obtained by collectively using two or more of the plurality of functional units.

As in the above-described embodiment, one processor may be constituted by a combination of one or more CPUs and software, and the processor may function as a plurality of functional units.

For example, a processor that realizes the functions of the entire system including the plurality of processing units in the information processing apparatus according to the embodiment of the present invention as one integrated circuit (IC) chip is used so as to be represented by a system on chip (SoC). A hardware configuration of the various processors described above may be an electric circuitry (circuitry) in which circuit elements such as semiconductor elements are combined.

EXPLANATION OF REFERENCES

10: user terminal
10A: first terminal
10B: second terminal
12: portable printer
14: network
16: server computer (information processing apparatus)
16A: processor
16B: memory
16C: communication interface
16D: storage device
21: acquisition unit
22: storage unit
23: specifying unit
24: estimation unit
25: selection unit
26: proposal unit
27: setting unit
F: photosensitive film
S: image printing system

What is claimed is:

1. An information processing apparatus comprising a processor and implementing printing of an image sent from a first user by a second user side,
   wherein the processor is configured to:
      execute proposal processing of proposing information including information about an image to be sent to the second user, information about setting of the printing, or information about a material to be used for the printing, and
      provide, to the first user or the second user, the proposed information based on a behavior history of the first user related to an image and a behavior history of the second user related to an image.

2. The information processing apparatus according to claim 1,
   wherein the processor is configured to execute specification processing of specifying an attribute of the second user from the behavior history of the second user, and
   in the proposal processing, the information corresponding to the attribute is proposed to the first user or the second user.

3. An information processing apparatus comprising a processor and implementing printing of an image sent from a first user by a second user side,
   wherein the processor is configured to:
      execute proposal processing of proposing information including information about an image to be sent to the second user, information about setting of the printing, or information about a material to be used for the printing, provide, to the first user or the second user, the proposed information based on a behavior history of the first user related to an image and a behavior history of the second user related to an image, and execute estimation processing of estimating a relationship between the first user and the second user based on the behavior history of the first user and the behavior history of the second user, and in the proposal processing, the information corresponding to the relationship is proposed to the first user or the second user.

4. The information processing apparatus according to claim 3, wherein the processor is configured to execute specification processing in which a psychographic attribute of the second user is specified as an attribute of the second user, and in the proposal processing, the information corresponding to the psychographic attribute based on the relationship among psychographic attributes of the second user is proposed to the first user or the second user.

5. The information processing apparatus according to claim 1, wherein a history related to printing of an image implemented by the first user side and a history related to transmission of an image to the second user from the first user are included in the behavior history of the first user, and a history related to printing of an image captured by the second user and a history related to printing of an image sent from the first user are included in the behavior history of the second user.

6. The information processing apparatus according to claim 5, wherein a history related to transmission of an image to the first user from the second user is further included in the behavior history of the second user.

7. The information processing apparatus according to claim 1, wherein the processor is configured to further execute selection processing of selecting an image of a transmission candidate to the second user from an image group acquired by the first user based on the behavior history of the first user and the behavior history of the second user, and in the proposal processing, the information about the image of the transmission candidate is proposed to the first user or the second user.

8. The information processing apparatus according to claim 7, wherein, in the selection processing, a plurality of corresponding images satisfying a preset condition are specified from the image group, and the image of the transmission candidate is selected from among the plurality of corresponding images.

9. The information processing apparatus according to claim 8, wherein, in the selection processing, the plurality of corresponding images are specified based on an imaging date and time of each image group.

10. The information processing apparatus according to claim 1, wherein the material is a medium on which an image is printed, and in the proposal processing, the information about a type of the medium to be used for the printing is proposed to the first user or the second user.

11. The information processing apparatus according to claim 10, wherein, in the proposal processing, the information about the type of the medium corresponding to the image selected based on the behavior history of the first user and the behavior history of the second user from an image group acquired by the first user is proposed to the first user or the second user.

12. The information processing apparatus according to claim 1, wherein an item of the information to be proposed in the proposal processing or an execution frequency of the proposal processing is set based on the behavior history of the first user and the behavior history of the second user.

13. An information processing method for implementing printing of an image sent from a first user by a second user side, the method comprising:

executing, by a processor, proposal processing of proposing information including information about an image to be sent to the second user, information about setting of the printing, or information about a material to be used for the printing, and providing, to the first user or the second user, the proposed information based on a behavior history of the first user related to an image and a behavior history of the second user related to an image.

14. An information processing method for implementing printing of an image sent from a first user by a second user side, the method comprising:

executing, by a processor, proposal processing of proposing information including information about an image to be sent to the second user, information about setting of the printing, or information about a material to be used for the printing, providing, to the first user or the second user, the proposed information based on a behavior history of the first user related to an image and a behavior history of the second user related to an image, and executing, by the processor, estimation processing of estimating a relationship between the first user and the second user based on the behavior history of the first user and the behavior history of the second user, wherein, in the proposal processing, the information corresponding to the relationship is proposed to the first user or the second user.

15. The information processing method according to claim 13, further comprising:

executing, by the processor, selection processing of selecting an image of a transmission candidate to the second user from an image group acquired by the first user based on the behavior history of the first user and the behavior history of the second user, wherein, in the proposal processing, the information about the image of the transmission candidate is proposed to the first user or the second user.

16. The information processing method according to claim 13, wherein the material is a medium on which an image is printed, and in the proposal processing, the information about a type of the medium to be used for the printing is proposed to the first user or the second user.

17. A recording medium readable by a computer and having a program recorded thereon causing a computer to execute each processing included in the information processing method according to claim 13.

18. A recording medium readable by a computer and having a program recorded thereon causing a computer to execute each processing included in the information processing method according to claim 14.

19. A recording medium readable by a computer and having a program recorded thereon causing a computer to execute each processing included in the information processing method according to claim 15.

20. A recording medium readable by a computer and having a program recorded thereon causing a computer to execute each processing included in the information processing method according to claim 16.

\* \* \* \* \*